US010417918B2

(12) United States Patent
Reddy et al.

(10) Patent No.: US 10,417,918 B2
(45) Date of Patent: Sep. 17, 2019

(54) METHODS AND SYSTEMS TO ASSIST IN A SEARCH AND RESCUE MISSION

(71) Applicant: Honeywell International Inc., Morris Plains, NJ (US)

(72) Inventors: Mahipal Reddy, Andhra Pradesh (IN); Anil Kumar Songa, Karnataka (IN); Bharath Sundararajan, Tamilnadu (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 67 days.

(21) Appl. No.: 15/002,079

(22) Filed: Jan. 20, 2016

(65) Prior Publication Data
US 2017/0206790 A1    Jul. 20, 2017

(51) Int. Cl.
*G08G 5/00* (2006.01)
*H04L 29/08* (2006.01)
*B64D 45/04* (2006.01)

(52) U.S. Cl.
CPC ......... *G08G 5/0086* (2013.01); *G08G 5/0008* (2013.01); *G08G 5/0021* (2013.01); *B64D 45/04* (2013.01); *H04L 67/12* (2013.01)

(58) Field of Classification Search
USPC .......................................................... 701/3
See application file for complete search history.

(56) References Cited

U.S. PATENT DOCUMENTS 6,092,009 A * 7/2000 Glover .................. G01C 5/005
340/970
6,236,351 B1 * 5/2001 Conner ................. G01S 7/2813
342/26 B (Continued)

FOREIGN PATENT DOCUMENTS

SG      152107    5/2009
WO      0010027   2/2000

OTHER PUBLICATIONS

Bevacqua, "Mixed-Initiative Planning and Execution for Multiple Drones in Search and Rescue Missions", Proceedings of the Twenty-Fifth International Conference on Automated Planning and Scheduling, DIETI, Universita degli Studi di Napoli Federico II via Claudio 21, 80125, Napoli, Italy, ICAPS. 2015 (http://ai2-s2-pdfs.s3.amazonaws.com/2f37/c1b58e.*

(Continued)

*Primary Examiner* — Jean Paul Cass
(74) *Attorney, Agent, or Firm* — Bookoff McAndrews, PLLC

(57) ABSTRACT

A method to assist in a search and rescue mission comprises: scanning at least a portion of a terrain at a search and rescue site using a scanning device to obtain searched area information, wherein searched area information is information captured by the scanning device of the at least a portion of the terrain; analyzing the searched area information obtained after scanning the at least a portion of the terrain; and communicating leading air vehicle information to at least one trailing air vehicle, wherein leading air vehicle information includes searched area information and analysis, and wherein the at least one trailing air vehicle is an air vehicle that reaches the search and rescue site after the at least one leading air vehicle.

18 Claims, 5 Drawing Sheets

(56) References Cited

U.S. PATENT DOCUMENTS

| | | | | |
|---|---|---|---|---|
| 6,292,721 | B1* | 9/2001 | Conner | G01C 5/005 340/970 |
| 7,133,123 | B1* | 11/2006 | Lei | G01C 3/08 356/4.01 |
| 7,874,513 | B1* | 1/2011 | Smith | B64C 11/001 244/12.4 |
| 8,941,677 | B1 | 1/2015 | Hallenbeck | |
| 9,036,509 | B1* | 5/2015 | Addepalli | H04W 4/046 370/259 |
| 9,104,201 | B1* | 8/2015 | Pillai | B64C 39/024 |
| 9,300,581 | B1* | 3/2016 | Hui | H04L 45/74 |
| 2004/0190767 | A1* | 9/2004 | Tedesco | G08B 13/19641 382/156 |
| 2005/0225777 | A1 | 10/2005 | Falbel | |
| 2005/0256876 | A1* | 11/2005 | Eidson | H04L 29/06 |
| 2007/0138345 | A1 | 6/2007 | Shuster | |
| 2008/0039985 | A1 | 2/2008 | Peyrucain et al. | |
| 2009/0219393 | A1 | 9/2009 | Vian et al. | |
| 2010/0004913 | A1* | 1/2010 | Becker | G01P 5/26 703/9 |
| 2010/0014066 | A1* | 1/2010 | Becker | G01P 5/26 356/28 |
| 2010/0042273 | A1* | 2/2010 | Meunier | G01C 23/005 701/9 |
| 2010/0092079 | A1* | 4/2010 | Aller | G06K 9/3216 382/165 |
| 2012/0029869 | A1* | 2/2012 | Muensterer | G01S 7/411 702/155 |
| 2012/0043413 | A1* | 2/2012 | Smith | B64C 29/0033 244/12.4 |
| 2012/0113754 | A1* | 5/2012 | Husseiny | A01M 29/16 367/139 |
| 2012/0214420 | A1 | 8/2012 | O'Connor et al. | |
| 2012/0234968 | A1* | 9/2012 | Smith | B64C 29/0033 244/12.3 |
| 2013/0215268 | A1 | 8/2013 | Nouvel et al. | |
| 2013/0293408 | A1* | 11/2013 | Underwood | G01S 7/412 342/146 |
| 2014/0303884 | A1* | 10/2014 | Levien | G08G 5/04 701/301 |
| 2014/0353422 | A1* | 12/2014 | Westbrook, Sr. | B64C 39/024 244/17.21 |
| 2015/0109104 | A1* | 4/2015 | Fadell | G08B 27/003 340/5.65 |
| 2015/0170526 | A1* | 6/2015 | Wang | B64C 19/00 701/16 |
| 2015/0254075 | A1* | 9/2015 | Ng | G06F 9/3012 712/221 |
| 2015/0278734 | A1* | 10/2015 | Grant | G06Q 10/06313 705/7.23 |
| 2015/0323932 | A1* | 11/2015 | Paduano | G05D 1/042 701/3 |
| 2015/0331099 | A1* | 11/2015 | Wu | G01S 13/876 342/32 |
| 2016/0026729 | A1* | 1/2016 | Gil | H04L 63/1416 726/23 |
| 2016/0033855 | A1* | 2/2016 | Wong | G03B 37/00 353/13 |
| 2016/0055754 | A1* | 2/2016 | Ling | G08G 5/0056 701/14 |
| 2016/0105608 | A1* | 4/2016 | Pettegrew | G06T 7/80 348/37 |
| 2016/0134932 | A1* | 5/2016 | Karp | H04W 4/80 348/155 |
| 2016/0137309 | A1* | 5/2016 | Abernathy | B64D 43/00 340/947 |
| 2016/0218940 | A1* | 7/2016 | Eranko | H04L 43/04 |
| 2016/0225267 | A1* | 8/2016 | DeBusk | G08G 5/0013 |
| 2016/0259337 | A1* | 9/2016 | Ruffier | G05D 1/0094 |
| 2016/0270056 | A1* | 9/2016 | Gupta | H04W 72/048 |
| 2016/0304198 | A1* | 10/2016 | Jourdan | B64C 39/024 |
| 2016/0313734 | A1* | 10/2016 | Enke | G05D 1/0088 |
| 2016/0349835 | A1* | 12/2016 | Shapira | G06F 3/011 |
| 2016/0363339 | A1* | 12/2016 | Blackley | A61L 9/032 |
| 2017/0045894 | A1* | 2/2017 | Canoy | G05D 1/0676 |
| 2017/0069214 | A1* | 3/2017 | Dupray | G08G 5/0021 |
| 2017/0111228 | A1* | 4/2017 | Obaidi | H04B 7/2606 |
| 2017/0192418 | A1* | 7/2017 | Bethke | G05D 1/0094 |
| 2017/0206790 | A1* | 7/2017 | Reddy | G08G 5/0086 |
| 2017/0220037 | A1* | 8/2017 | Berestov | G05D 1/0027 |
| 2017/0227669 | A1* | 8/2017 | Kulcinski | G01V 5/0016 |
| 2017/0283087 | A1* | 10/2017 | McNeill | G01S 17/42 |
| 2017/0350973 | A1* | 12/2017 | Dunik | G01C 21/165 |
| 2017/0355458 | A1* | 12/2017 | Chen | B64C 39/024 |
| 2018/0054604 | A1* | 2/2018 | Boyd | H04N 13/239 |
| 2018/0157255 | A1* | 6/2018 | Halverson | B64C 39/024 |
| 2019/0210726 | A1* | 7/2019 | Wu | B64D 1/18 |

OTHER PUBLICATIONS

Ludovic Apvrille et al., Autonomous Drones for Assisting Rescue Services within the context of Natural Disasters, Institut Mines-Telecom, Telecom ParisTech, LTCI CNRS, CS 50193, 06904 Sophia Antipolis cedex, France, {ludovic.apvrille, tullio.tanzi}@telecom-paristech.fr (http://ieeexplore.ieee.org/stamp/stamp.jsp?arnumber=6929384).*

Burkinshaw, "SARMApp Search and Rescue Mapping Application", "retrieved from http://www.geos.ed.ac.uk/~mscgis/09-10/s0569580/", , pp. 1-3, Publisher: MSc Geographical Information Science 2010.

Kindt, "SARTrack Limited Search and Rescue Radio Tracking", "retrieved from http://www.sartrack.co.nz/WhyUse.html", Sep. 1, 2012, pp. 1-4.

European Patent Office, "Extended European Search Report for EP Application No. 17151469.8" "Foreign Counterpart to U.S. Appl. No. 15/002,079", dated May 31, 2017, pp. 1-6, Published in: EP.

* cited by examiner

METHODS AND SYSTEMS TO ASSIST IN A SEARCH AND RESCUE MISSION

BACKGROUND

In search and rescue missions, the terrain in which the operation is to be performed is often unknown to the vehicle operator. Specifically, in an airborne search and rescue mission, a considerable amount of time is spent to identify a usable landing zone. Conventionally, the landing zone is identified by each aircraft on its own. When the aircraft reaches the rescue site, the terrain is scanned by the aircraft crew to find a suitable spot to land. In some search and rescue missions, a trailing aircraft can identify a particular area that has been searched by a leading aircraft over voice communication. However, the exact landing zones would not be identified by a trailing aircraft unless the leading aircraft is in the visible range.

For the reasons stated above and for other reasons stated below, it will become apparent to those skilled in the art upon reading and understanding the specification, there is a need in the art for improved systems and methods for providing assistance to trailing aircrafts during search and rescue missions.

SUMMARY

A method to assist in a search and rescue mission is provided. The method comprises scanning at least a portion of a terrain at a search and rescue site using a scanning device to obtain searched area information, wherein searched area information is information captured by the scanning device of the at least a portion of the terrain. The method further comprises analyzing the searched area information obtained after scanning the at least a portion of the terrain. The method further comprises communicating leading air vehicle information to at least one trailing air vehicle, wherein leading air vehicle information includes searched area information and analysis, and wherein the at least one trailing air vehicle is an air vehicle that reaches the search and rescue site after the at least one leading air vehicle.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
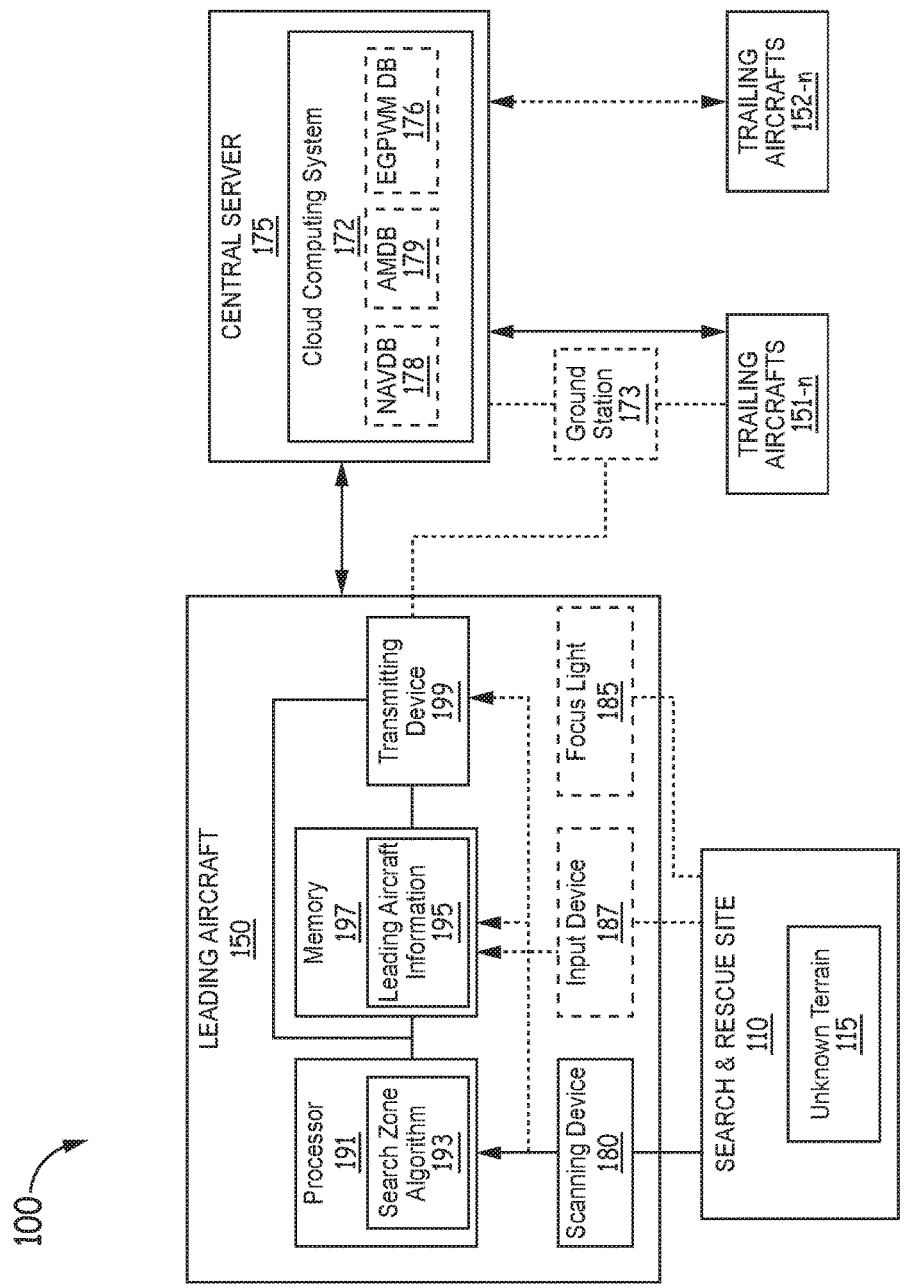
FIGS. 1A-1B show an example of a search and rescue system according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure address the need to provide effective and timely assistance to trailing vehicles in a search and rescue (SAR) mission. Often, a plurality of vehicles are involved in a SAR mission. One of the plurality of vehicles involved in the SAR mission reaches the SAR zone and communicates the information regarding the SAR mission on to a central server. The information can be communicated by uploading the information on a data cloud computing system or through datalink communication with a ground station. This information can be communicated simultaneously as the vehicle performs the search. In some examples, the information can be communicated after the search has been performed. This information is accessible by other vehicles trailing the vehicle that has performed the search and reduces the burden on the trailing vehicles. For example, a leading vehicle scans and analyzes at least a part of the SAR zone and can communicate GPS coordinates of the safe landing/parking zone at the SAR zone. When a trailing vehicle reaches the SAR site it can land/park at the safe landing/parking zone without performing an additional scan of the SAR zone, thus, saving time.

In the embodiments described herein, the vehicle that communicates the information regarding the SAR mission on to a central server is also referred to as the leading vehicle. When the leading vehicle reaches the SAR site, the terrain at the SAR site is often an unknown terrain. This unknown terrain may be terrain that has not yet been searched and/or analyzed by any of the vehicles involved in the search and rescue mission, or it may be terrain that has changed and the vehicles involved in the search and rescue mission are unaware of the changes. For example, all or part of the terrain previously usable for a purpose (such as a landing zone for an aircraft) may have been washed off and is no longer usable for the purpose. In such a case, the terrain is unknown to trailing vehicles because the trailing vehicles are unaware that the changed terrain is not usable for the purpose.

In exemplary embodiments, an initial scanning is to be performed by the leading vehicle to analyze the terrain at the SAR site. In some vehicles, the scanning device used to perform scanning of the terrain is a sensor device that scans the unknown terrain. The sensor device could be a radar sensor, a lidar sensor, an enhanced vision system (EVS) technology or another similar device used to scan the unknown terrain. In some examples, this scanning device can be a video camera to scan and analyze information of the unknown terrain. In exemplary embodiments, this scanning device can be installed directly in the vehicle. In exemplary embodiments, the scanning device is handheld by the crew of the vehicle or attached to wearables on the crew of the vehicle (such as video camera attached to a helmet worn by the crew). The information captured by the scanning device is sent as feed into a processor on the vehicle to analyze the unknown terrain. The basic parameters of the vehicle along with the analysis of the terrain are communicated to trailing vehicles. The basic parameters and analysis can be communicated through a data access facility such as central server or a ground station. The basic parameters and analysis of the terrain at SAR site can be communicated using a central server comprising a cloud with a dynamic database that is accessible to trailing vehicles. The parameters and analysis can also be communicated using datalink communication via a ground station. In some examples, the information communicated to the central server includes an indication of the type of subtask (for example, searching debris, searching bodies, etc.) that the vehicle in a particular mission is assigned.

In some examples of the embodiments described herein, one or more of the plurality of vehicles involved in the SAR mission are air vehicles. In exemplary embodiments, air vehicles involved in the SAR mission are aircrafts such as airplanes. In exemplary embodiments, air vehicles involved in the SAR mission are aircrafts such as helicopters. In exemplary embodiments, other air vehicles can be used. In other embodiments, other vehicles are used, such as a ship or a van.

Figure 1B:
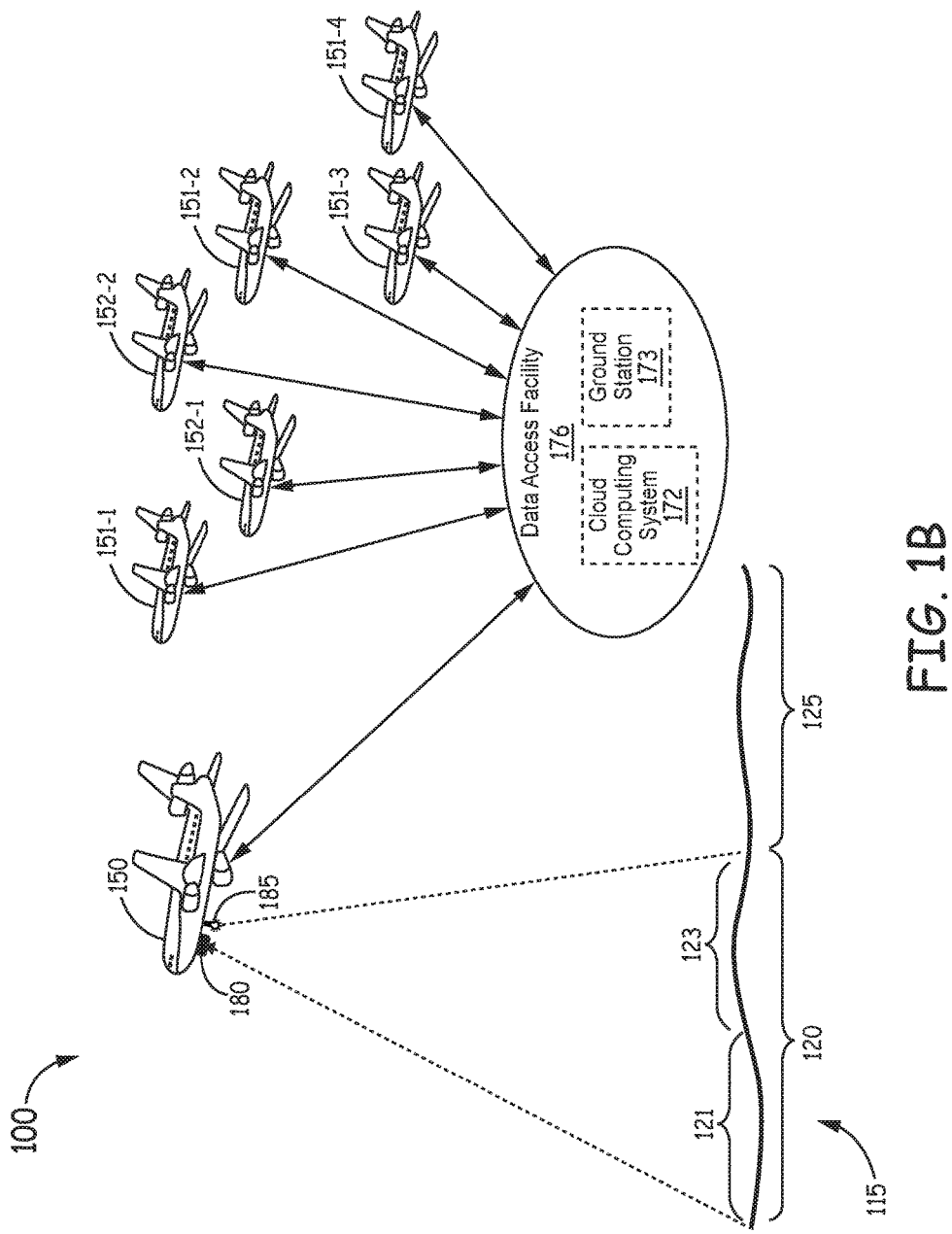

FIGS. 1A-1B show an example of a search and rescue system 100 for one embodiment of the present disclosure. As shown in FIGS. 1A-1B, a leading aircraft 150 reaches a search and rescue site 110. As seen in FIG. 1B, leading aircraft 150 can include a scanning device 180 that scans at least an area 120 of the terrain 115 at search and rescue site 110 to identify a safe landing zone within the searched area 120. The information (such as still images, video images, other sensor inputs such as radar or lidar images, etc.) captured by the scanning device 180 is used as a feed to a processor 191 located in the leading aircraft 150. Processor 191 is configured to process a search zone algorithm 193 analyzing the searched area 120. In exemplary embodiments, search zone algorithm 193 uses the feed from the scanning device 180 to analyze the information received and to identify a safe landing zone 121. For example, in one embodiment, the search zone algorithm 193 can be configured to determine whether the terrain includes a large enough area with flat ground as required by leading aircraft 150 to land safely based on terrain altitude over the scanned area as captured by scanning device 180. Area 123, shown in FIG. 1B, is determined not suitable for landing, and is also described herein as unsafe landing zone 123. In exemplary embodiments, scanning device 180 can be a radar sensing system, a lidar sensing system, an enhanced visual system (EVS) or another similar sensor device. In exemplary embodiments, scanning device 180 can be a video camera and the images scanned by the video camera are used as a feed to identify a safe landing zone 121.

In some embodiments, the aircraft crew can visually search area 120 and spot safe landing zone 121. The aircraft crew can manually input data (such as the GPS coordinates of search area 120 and/or safe landing zone 121, etc.) into leading aircraft information 197 using an input device 187 included in leading aircraft 150. The input device 187 can be a mouse, a keyboard, a touch screen, or any other such device. The input device 187 can be coupled to memory 197 and/or processor 191.

The analysis of searched area 120 by processor 191 is sent to memory 197 located in leading aircraft 150. Memory 197 of leading aircraft 150 further includes leading aircraft information 195 that is communicated to trailing aircrafts 151-n and/or 152-n. Leading aircraft information 195 can be stored for later retrieval.

Trailing aircrafts 151-n and 152-n are aircrafts that are involved in the same mission as leading aircraft 150 but have not yet reached search and rescue site 110. Trailing aircrafts 151-n and 152-n reach the search and rescue site 110 after the leading aircraft 150. In the examples shown in FIGS. 1A-2B, trailing aircrafts 151-n (151-1, 151-2, etc.) are aircrafts that are assigned to perform subtask(s) similar to leading aircraft 150. In the examples shown in FIGS. 1A-2B, trailing aircrafts 152-n (152-1, 152-2, etc.) are aircrafts that are assigned to perform subtask(s) different from leading aircraft 150. For example, leading aircraft 150 and trailing aircrafts 151-n may be assigned to look for debris whereas trailing aircrafts 152-n may be assigned to look for bodies.

In exemplary embodiments, analysis of searched area 120 is included in leading aircraft information 195. Leading aircraft information 195 may include one or more of the following: information and/or analysis of the terrain 115 at search and rescue site 110 processed by processor 191, basic parameters of the leading aircraft 150, and other information related to crew members of leading aircraft 150, activities involved in the mission, environmental factors and time of day. Further, in some examples, the leading aircraft information 195 communicated to the central server 175 includes an indication of the type of subtask (for example, searching debris, searching bodies, etc.) that leading aircraft 150 is assigned for a given mission. In some examples, the type of subtask may be indicated by different colors or fonts where each color or font represents a particular subtask. In some examples, the type of subtask may be indicated by including a note specifying the subtask of leading aircraft 150.

The basic parameters of leading aircraft 150 may include the type of leading aircraft 150, one or more of the roll and pitch of leading aircraft 150, heading of leading aircraft 150, altitude at which leading aircraft 150 is at the time of scanning and/or communicating the information to central server 175, and GPS coordinates of leading aircraft 150. Information and analysis of the unknown terrain communicated to central server 175 may include GPS coordinates of the searched zone 120, image of the searched terrain, GPS coordinates of safe landing zone 121, image of the safe landing zone 121, some type of metadata that indicates safe landing zone 121 as safe for landing. Leading aircraft information 195 may include other information such as any head borne devices of a crew member (for example, pilot) of the leading aircraft 150, head movement detection while scanning the terrain 115 at search and rescue site 110 and time of day when the terrain 115 at search and rescue site 110 was scanned and/or analyzed. Leading aircraft information 195 may further include the type of activity involved in the mission before and after landing.

Leading aircraft 150 further comprises at least a transmitting device 199 (such as a transmitter, transceiver, etc.). In some examples, live feed from the scanning device 180 is sent to transmitting device 199. Analysis of the searched zone 120 and leading aircraft information 195 are sent to transmitting device 199 and communicated to central server 175 and/or ground station 173. This information can be communicated to trailing aircrafts 151-n and 152-n via at least one of a central server 175 or ground station 173.

Central server 175 comprises cloud 172. Cloud 172 includes a dynamic database. This dynamic database can be any of the following such as a navigational database (NAVDB) 178, aerodrome mapping database (AMDB) 179, enhanced ground proximity warning module database (EG- PWM DB) or other high resolution dynamic database. Cloud 172 is accessible to at least one of leading aircraft 150, ground station 173 and trailing aircrafts 151-*n* and 152-*n*. In exemplary embodiments, leading aircraft information 195 uploaded to cloud 172 can be geotagged. As known to one skilled in the art, geotagging is the process of adding geographical identification metadata to various media such as photograph or video, or communication messages. In some exemplary embodiments, leading aircraft information 195 can be synced to cloud 172. In such exemplary embodiments, trailing aircrafts 151-*n* and 152-*n* are able to view leading aircraft information 195 as captured by scanning device 180. Syncing leading aircraft information 195 to cloud 172 allows trailing aircrafts 151-*n* and 152-*n* to be prepared for the situation before reaching search and rescue site 110. For example, scanning device 180 (such as a video camera or other sensor device (ex. radar system, lidar system, EVS, etc.)) can be synced to cloud 172 so that the images captured at the search and rescue site 110 are accessible to multiple trailing aircrafts 151-*n* and 152-*n* prior to reaching the SAR site 110. In some examples, leading aircraft information 195 can be view by trailing aircrafts 151-*n* and 152-*n* simultaneously as the leading aircraft 150 performs the assigned SAR task.

In exemplary embodiments, leading aircraft 150 can directly upload leading aircraft information 195 to cloud 172. The leading aircraft information 195 uploaded to cloud 172 can be accessed by trailing aircrafts 151-*n* and/or 152-*n* in at least one of two ways. In some example embodiments, the uploaded leading aircraft information 195 can be accessed by ground station 173, which then uses datalink communication to uplink leading aircraft information 195 to one or more trailing aircrafts 151-*n* and 152-*n*. In some example embodiments, the uploaded leading aircraft information 195 can be directly accessed by trailing aircrafts 151-*n* and 152-*n* by connecting to central server 175 having access to cloud 172.

Alternatively, in some examples, leading aircraft 150 communicates leading aircraft information 195 to ground station 173 via datalink communication. The leading aircraft information 195 that is downlinked to ground station 173 can then be accessed by trailing aircrafts 151-*n* and/or 152-*n* in at least one of two ways. In some example embodiments, the downlinked leading aircraft information 195 is uploaded into cloud 175, which is then directly accessed by trailing aircrafts 151-*n* and 152-*n* by connecting to central server 175 and having access to cloud 172. In some example embodiments, ground station 173 uses datalink communication to uplink the downlinked leading aircraft information 195 to one or more trailing aircrafts 151-*n* and 152-*n*.

Leading aircraft 150 may further include focus light 185 that can be used for SAR missions performed when it is dark (such as at night). When an SAR mission is performed at night, area 120 is tracked by leading aircraft 150 using focus light 185. Based on the altitude of leading aircraft 150 from which the focus light 185 was used, searched zone 120 can be analyzed and mapped. Like a daytime SAR mission, leading aircraft information 195 can be geotagged and synced on to cloud 172 comprised in central server 175 or leading aircraft information 195 can be downlinked to ground station 173.

After trailing aircrafts 151-*n* and 152-*n* reach search and rescue site 110 additional scanning of terrain at search and rescue site 110 may be needed. Trailing aircrafts 151-*n* and 152-*n* can begin from a particular location of search and rescue site 110. For example, trailing aircraft 151-1 can land at safe landing zone 121 and trailing aircraft 151-2 can scan unsearched area 125 of search and rescue site 110. The information captured and analyzed by trailing aircraft 151-2 can also be communicated via cloud 172 or ground station 173 to other trailing aircrafts such as 151-3, which trails trailing aircraft 151-2 and reaches search and rescue site 110 after trailing aircraft 151-2. Thus, trailing aircraft 151-2 is a leading aircraft with respect to trailing aircraft 151-3 and can communicate information similarly to the process for leading aircraft 150 described above.

In an example, trailing aircraft 151-1 reaches search and rescue site 110 after leading aircraft 150. On reaching search and rescue site 110, trailing aircraft 151-1 may discover that safe landing zone 121 is not suitable for landing because of changes to the terrain of search and rescue site 110 (for example, a safe landing zone 121 gets washed off, safe landing zone 121 becomes unsuitable due to excessive landings, portions of safe landing zone 121 slide away, etc.). Trailing aircraft 151-1 can communicate this updated information via cloud 172 or ground station 173 to other trailing aircrafts such as 151-3, which trails trailing aircraft 151-1 and will reach search and rescue site 110 after trailing aircraft 151-1. Thus, trailing aircraft 151-1 is now a leading aircraft and can communicate information similarly to the process for leading aircraft 150 described above.

Figure 2B:
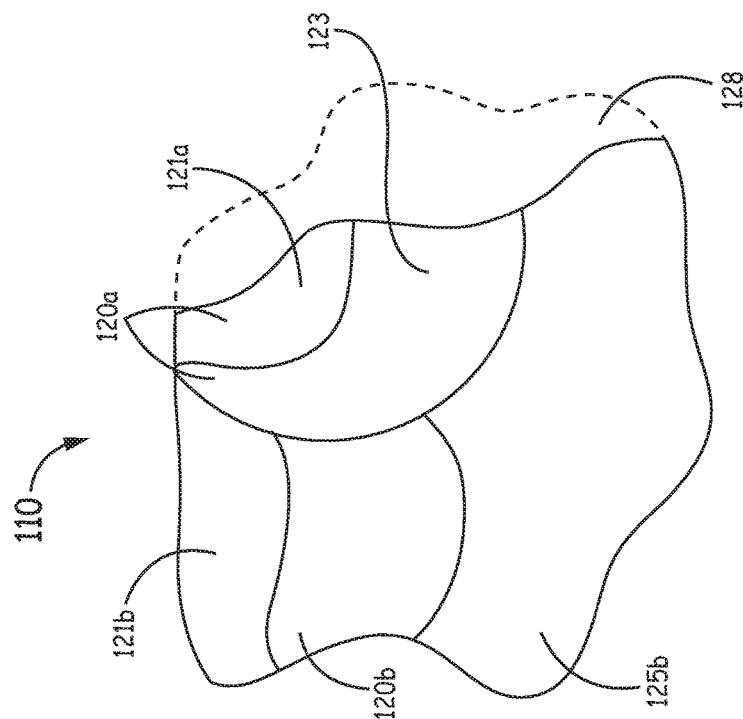
FIG. 2B shows an exemplary overhead view of an unknown terrain as viewed and scanned by a trailing aircraft according to one embodiment of the present disclosure.
Figure 2A:
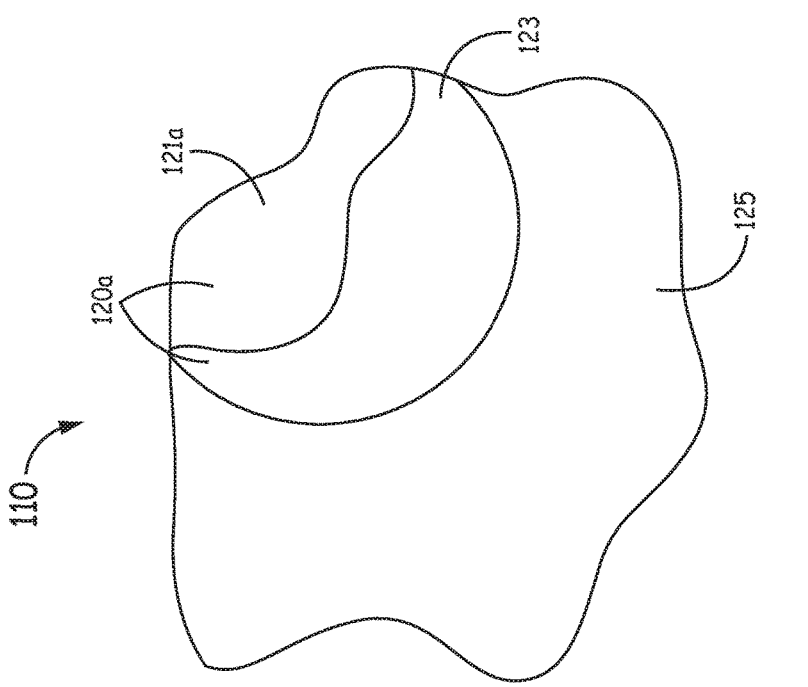
FIG. 2A shows an exemplary overhead view of an unknown terrain as viewed and scanned by a leading aircraft according to one embodiment of the present disclosure.

One embodiment of such an example is depicted in FIGS. 2A and 2B. FIG. 2A shows an overhead view of an example of terrain 115 at search and rescue site 110 as viewed and scanned by the leading aircraft 150 of FIG. 1A-1B. The leading aircraft reaches the search and rescue site 110 and scans area 120 as described above with respect to FIGS. 1A and 1B. Area 121 is determined as safe landing zone and area 123 is determined as unsafe landing zone. Leading aircraft information 195 including the information and analysis of scanned area 120 is communicated to trailing aircraft 151-1.

FIG. 2B depicts an overhead view of terrain 115 at search and rescue site 110 at a future time as viewed by trailing aircraft 151-1. As shown in FIG. 2B, when trailing aircraft 151-1 reaches search and rescue site 110, it discovers that parts of terrain 115 have been changed (for example, part of the terrain may have been washed off). On further analysis, trailing aircraft 151-1 may determine that because a major portion of safe landing zone 121 is washed off, safe landing zone 121 is no longer suitable for landing. Trailing aircraft 151-1 may perform a new scan and analysis of terrain 115 to determine a new safe landing zone 121*b* for aircrafts (such as 151-2 and 151-3) that trail trailing aircraft 151-1. The information with respect to washed off area 128, the new searched area 120*b*, and new safe landing zone 121*b* is communicated to other trailing aircrafts 151-*n* similarly as leading aircraft 150. Thus, other trailing aircrafts (such as 151-2, 151-3, 151-4, etc.) have access to an aggregated sum of areas (120*a* and 120*b*) searched by different aircrafts (leading aircraft 150 and trailing aircraft 151-1) involved in the same mission. Area 125*b* is the area of terrain 115 of search and rescue site 110 that remains unsearched after trailing aircraft 151-1 has performed the new scan.

Because trailing aircrafts 151-*n* and 152-*n* may need to perform additional scanning to assist other trailing aircrafts in a manner similar to leading aircraft 150, trailing aircrafts 151-*n* and 152-*n* also comprise a scanning device, a processor, a memory and a transmitting device. The scanning device, processor, memory and transmitting device of trailing aircrafts 151-*n* and 152-*n* function similarly to scanning device 180, processor 191, memory 197 and transmitting device 199 respectively of leading aircraft 150 describe above with respect to FIGS. 1A and 1B.

Figure 3:
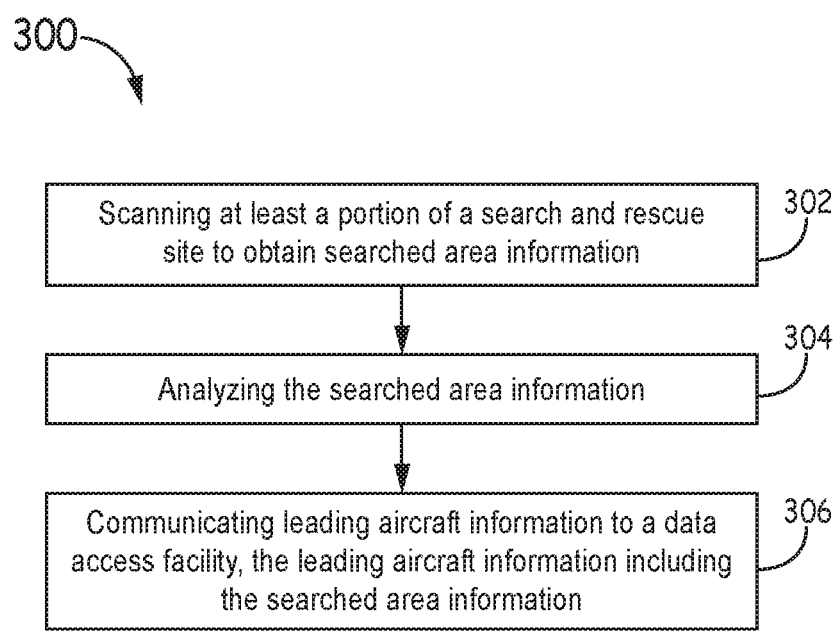
FIG. 3 illustrates an exemplary process of assisting in a search and rescue mission according to one embodiment of the present disclosure.
Figure 4:
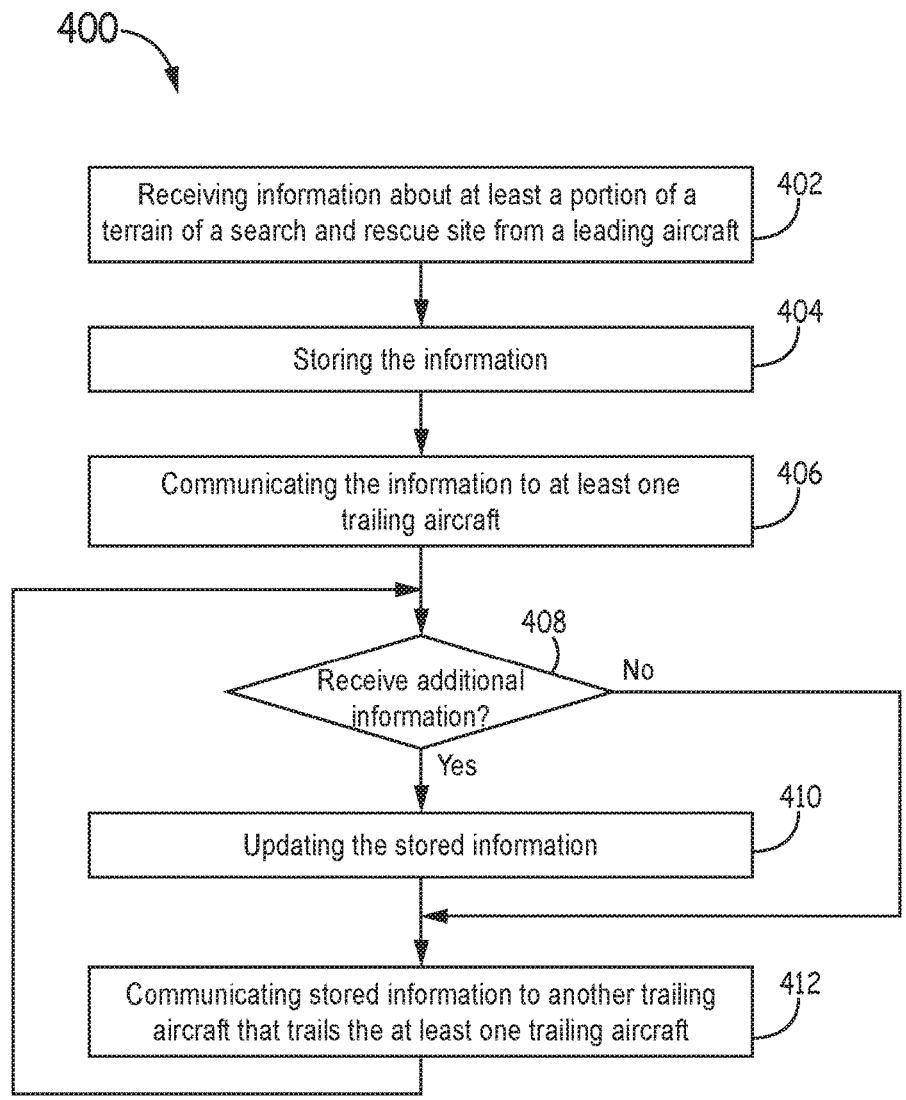
FIG. 4 illustrates an exemplary process of assisting a trailing aircraft in a search and rescue mission according to one embodiment of the present disclosure.

FIGS. 3 and 4 are flow diagrams showing exemplary methods used in assisting in a search and rescue mission. As discussed herein, method 300 of FIG. 3 is described with respect to examples of search and rescue systems shown in FIGS. 1A, 1B, 2A and 2B. However, method 300 may apply to other search and rescue systems as well. Method 300 shows an exemplary process from the perspective of a lead aircraft or a trailing aircraft for a later trailing aircraft.

Method 300 begins at block 302 with scanning at least a portion of terrain at a search and rescue site. In one embodiment, the scanning is performed using a scanning device to obtain searched area information such as using scanning device 180 of leading aircraft 150. In exemplary embodiments, scanning at least a portion of the terrain further comprises using a focus light, such as focus light 185 of leading aircraft 150, to search the terrain. In exemplary embodiments, the scanning device may be a sensor device (such as a radar system, a lidar system, an enhanced visual system (EVS), etc.) and the information captured by the sensor device is used as a feed to analyze the searched area information. In exemplary embodiments, the scanning device may be a video camera and the images scanned by the video camera are used as a feed to analyze the searched area information.

Method 300 proceeds to block 304 with analyzing the searched area information. In one embodiment, the searched area information is the information obtained after scanning the at least a portion of the terrain. In exemplary embodiments, analyzing the searched area information further comprises identifying a safe landing zone using, for example, a search zone algorithm such as search zone algorithm 193 of leading aircraft 150.

Method 300 proceeds to block 306 with communicating leading aircraft information to a data access facility such as a central server, for example, central server 175 or ground station, for example, ground station 173. This leading aircraft information is then provided to at least one trailing aircraft to reduce the burden on the trailing aircraft when approaching the search and rescue site. In some embodiments, the leading aircraft information includes searched area information and analysis. Further, the at least one trailing aircraft is an aircraft that reaches the search and rescue site after the at least one leading aircraft. Communicating leading aircraft information to the at least one trailing aircraft may further comprise communicating any of basic parameters of the leading aircraft, information related to crew members of leading aircraft, activities involved in the search and rescue mission, time of day, and indication of type of subtask assigned to leading aircraft.

In exemplary embodiments, communicating leading aircraft information to the at least one trailing aircraft further comprises uploading leading aircraft information on a central server. The central server comprises a cloud having a dynamic database such as navigational database, aerodrome mapping database, enhanced ground proximity warning module database, or other similar database. In a further example, uploading leading aircraft information on a central server further comprises geotagging leading aircraft information to a cloud comprised on the central server. In exemplary embodiments, uploading leading aircraft information on a central server further comprises syncing leading aircraft information to a cloud comprised on the central server. Alternatively, in exemplary embodiments, communicating leading aircraft information to the at least one trailing aircraft further comprises communicating leading aircraft information to a trailing aircraft via datalink communication.

FIG. 4 is a flow diagram showing an exemplary method of assisting a trailing aircraft in a search and rescue mission. As discussed herein, method 400 is described with respect to examples of search and rescue systems shown in FIGS. 1A, 1B, 2A and 2B. However, method 400 may apply to other search and rescue systems as well. Method 400 is described from the perspective, for example, of central server 175 or ground station 173.

Method 400 begins at block 402 with receiving leading aircraft information about a search and rescue site from a leading aircraft. In one embodiment, a central server including a cloud computing system, such as cloud computing system 172, can receive this information either directly from leading aircraft 150 or through ground station 173. Method 400 proceeds to block 404 with storing this information. Method 400 proceeds to block 406 with communicating the stored information to at least one trailing aircraft. In exemplary embodiments, communicating leading aircraft information to the at least one trailing aircraft further comprises providing the at least one trailing aircraft access to the stored information.

When a trailing aircraft reaches a search and rescue site, it may determine that terrain of the search and rescue site has changed. In such an example, method 400 proceeds to block 408 with checking if additional information about the terrain is received. If no information is received, Method 400 proceeds to block 412 with communicating the stored information to another trailing aircraft. Another trailing aircraft is an aircraft that trails the at least one trailing aircraft.

If at block 408, additional information about the terrain is received, method 400 proceeds to block 410 with updating the stored information. The updated stored information may add to or replace the stored information. Finally, method 400 proceeds to block 412 with communicating the stored information to another trailing aircraft. Method 400 goes back to step 408 when a trailing aircraft reaches the search and rescue site. Thus, an aggregated sum of areas is stored in a cloud computing system, wherein the aggregated sum of areas are a sum of portions of the terrain searched by different aircrafts involved in the same mission. In exemplary embodiments of methods 300 and 400, the at least one trailing aircraft is responsible for performing a subtask similar to subtask of the at least one leading aircraft.

Example Embodiments

Example 1 includes a method to assist in a search and rescue mission, the method comprising: scanning at least a portion of a terrain at a search and rescue site using a scanning device to obtain searched area information, wherein searched area information is information captured by the scanning device of the at least a portion of the terrain; analyzing the searched area information obtained after scanning the at least a portion of the terrain; and communicating leading air vehicle information to at least one trailing air vehicle, wherein leading air vehicle information includes searched area information and analysis, and wherein the at least one trailing air vehicle is an air vehicle that reaches the search and rescue site after the at least one leading air vehicle.

Example 2 includes the method of Example 1, wherein when the at least one trailing air vehicle reaches the search and rescue site after the at least one leading air vehicle and determines the searched area information has changed, the method further comprises communicating the changed searched area information to at least one other trailing air vehicle, wherein the at least one other trailing air vehicle is an air vehicle that trails the at least one trailing air vehicle.

Example 3 includes the method of any of Examples 1-2, wherein communicating leading air vehicle information to the at least one trailing air vehicle further comprises uploading leading air vehicle information on a central server.

Example 4 includes the method of Example 3, wherein the central server comprises a cloud having a dynamic database such as navigational database or aerodrome mapping database.

Example 5 includes the method of any of Examples 3-4, wherein uploading leading air vehicle information on a central server further comprises geotagging leading air vehicle information to a cloud comprised on the central server.

Example 6 includes the method of any of Examples 3-5, wherein uploading leading air vehicle information on a central server further comprises syncing leading air vehicle information to a cloud computing system comprised on the central server.

Example 7 includes the method of any of Examples 1-6, wherein communicating leading air vehicle information to the at least one trailing air vehicle further comprises communicating leading air vehicle information to a trailing air vehicle via datalink communication.

Example 8 includes the method of any of Examples 1-7, wherein analyzing the searched area information further comprises identifying a safe landing zone within the at least one portion of the search and rescue site.

Example 9 includes the method of any of Examples 1-8, wherein scanning at least a portion of a terrain of a search and rescue site further comprises using a focus light to search the terrain.

Example 10 includes the method of any of Examples 1-9, wherein communicating leading air vehicle information to the at least one trailing air vehicle further comprises communicating any of basic parameters of the leading air vehicle, information related to crew members of leading air vehicle, activities involved in the search and rescue mission, time of day, and indication of type of subtask assigned to leading air vehicle.

Example 11 includes the method of any of Examples 1-10, wherein the at least one trailing air vehicle is responsible for performing a subtask similar to subtask of the at least one leading air vehicle.

Example 12 includes the method of any of Examples 1-11, further comprising providing the at least one trailing air vehicle access to an aggregated sum of areas, wherein the aggregated sum of areas are a sum of portions of different areas of the terrain searched by different air vehicles involved in the same mission.

Example 13 includes a system for a search and rescue (SAR) mission, the system comprising: at least one leading air vehicle, wherein the at least one leading air vehicle further comprises: at least one scanning device to scan at least a portion of a terrain of a search and rescue site; at least one processor coupled to the at least one scanning device, the at least one processor configured to process a search zone algorithm that analyzes the scanned at least a portion of the search and rescue site; at least one memory coupled to the at least one processor, wherein the memory includes leading air vehicle information, wherein the leading air vehicle information includes information of the terrain and analysis of the scanned at least a portion of the search and rescue site processed by the at least one processor; and at least one transmitter coupled to the at least one memory, wherein the transmitter is configured to transmit the leading air vehicle information to at least one of a ground station or a central server.

Example 14 includes the system of Example 13, further comprising at least one of a ground station or a central server configured to receive leading air vehicle information from the at least one leading air vehicle and communicate the leading air vehicle information to at least one trailing air vehicle.

Example 15 includes the system of Example 14, wherein the central server further comprises a cloud computing system having a dynamic database such as navigational database or aerodrome mapping database.

Example 16 includes the system of any of Examples 13-15, wherein the at least one leading air vehicle further comprises a focus light to scan the unknown terrain.

Example 17 includes the system of any of Examples 13-16, wherein leading air vehicle information further comprises one or more of basic parameters of the leading air vehicle, information related to crew members of leading air vehicle, activities involved in the search and rescue mission, time of day, and indication of type of subtask assigned to leading air vehicle.

Example 18 includes the system of any of Examples 13-17, wherein the at least one trailing air vehicle further comprises: at least one trailing air vehicle scanning device to scan an additional portion of the terrain of the search and rescue site, wherein the additional portion is different from the at least one portion of the terrain; at least one processor coupled to the at least one scanning device, the at least one processor configured to process a search zone algorithm that analyzes the additional portion of the terrain; at least one memory coupled to the at least one processor, wherein the memory includes trailing air vehicle information, wherein the trailing air vehicle information includes information and analysis of the additional portion of the terrain; and at least one transmitter coupled to the at least one memory, wherein the transmitter is configured to transmit the trailing air vehicle information to at least one of a ground station or a central server.

Example 19 includes a method to assist in a search and rescue mission, the method comprising: receiving leading air vehicle information about a search and rescue site from a leading air vehicle, wherein leading air vehicle information includes searched area information, wherein searched area information is information of at least a portion of a terrain of the search and rescue site; storing the leading air vehicle information to provide access to at least one trailing air vehicle; and communicating the leading air vehicle information to the at least one trailing air vehicle, wherein the at least one trailing air vehicle is an air vehicle that trails the leading air vehicle.

Example 20 includes a method of Example 19, the method further comprising: receiving additional information about the terrain of the search and rescue site when the at least one trailing air vehicle reaches the search and rescue site and determines that the searched area information has changed; updating the leading air vehicle information to include additional information about the terrain; and communicating updated leading air vehicle information to at least one other trailing air vehicle, wherein the at least one other trailing air vehicle trails the at least one trailing air vehicle.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method to assist in a search and rescue mission, the method comprising:
scanning a portion of a terrain at a search and rescue site using a scanning device to obtain searched area information, the searched area information including information captured by the scanning device of the portion of the terrain and images of the terrain;
analyzing the searched area information;
determining a usable part of the scanned portion of the terrain that is suitable for at least one of landing and parking an air vehicle, images of the usable part as a safe landing zone, an unusable part of the scanned portion of the terrain that is not suitable for at least one of landing and parking the air vehicle, and an un-scanned portion of the terrain, based on an analysis result of the analyzing the searched area information and the images of the terrain; and
communicating leading air vehicle information and other information to at least one trailing air vehicle or a central server, by uploading and syncing the leading air vehicle information on the central server,
wherein the leading air vehicle information includes the searched area information, the analysis result, a determination of the usable part, the unusable part, and the un-scanned portion, a GPS coordinate, and/or the images of the usable part,
wherein the other information includes one or more of basic parameters of the at least one leading air vehicle, information related to crew members of the at least one leading air vehicle, activities involved in the search and rescue mission, time of day, and/or indication of type of subtask assigned to the at least one leading air vehicle, and
wherein the at least one trailing air vehicle is an air vehicle that reaches the search and rescue site after an at least one leading air vehicle.

2. The method of claim 1, wherein when the at least one trailing air vehicle reaches the search and rescue site after the at least one leading air vehicle and the at least one trailing air vehicle determines the searched area information has changed, the method further comprises:
scanning another portion of the terrain at the search and rescue site using another scanning device to obtain updated searched area information, the updated searched area information including information captured by the another scanning device of a portion or all of one or both of the scanned portion of the terrain and the un-scanned portion of the terrain; and
communicating a changed searched area information to at least one other trailing air vehicle or the central server, the changed searched area information having been based on the updated searched area information, wherein the at least one other trailing air vehicle is an air vehicle that trails the at least one trailing air vehicle.

3. The method of claim 1, wherein the communicating the leading air vehicle information to the at least one trailing air vehicle or the central server further includes:
uploading and syncing the other information on the central server.

4. The method of claim 3, wherein the central server comprises a cloud having a dynamic database such as navigational database or aerodrome mapping database.

5. The method of claim 3, wherein the uploading the leading air vehicle information on the central server further includes geotagging the leading air vehicle information to a cloud comprised on the central server so as to include the GPS coordinate of the usable part.

6. The method of claim 3, wherein the syncing the leading air vehicle information on the central server includes syncing the leading air vehicle information to a cloud computing system comprised on the central server.

7. The method of claim 1, wherein the communicating the leading air vehicle information to the at least one trailing air vehicle or the central server further includes:
communicating the leading air vehicle information to the at least one trailing air vehicle via datalink communication.

8. The method of claim 1, wherein the analyzing the searched area information further includes identifying a safe landing zone within the portion of the search and rescue site as the usable part of the scanned portion of the terrain.

9. The method of claim 1, wherein the scanning the portion of the terrain of the search and rescue site further includes using a focus light to search the terrain.

10. The method of claim 1, wherein the at least one trailing air vehicle is responsible for performing a subtask similar to a subtask of the at least one leading air vehicle.

11. The method of claim 1, further comprising providing the at least one trailing air vehicle access to an aggregated sum of areas,
wherein the aggregated sum of areas are a sum of portions of different areas of the terrain searched by different air vehicles involved in a same mission,
the sum of portions of different areas includes:
the usable part of the scanned portion of the terrain, the unusable part of the scanned portion of the terrain, and the un-scanned portion of the terrain from the at least one leading air vehicle, and
updated portions or all of the usable part, the unusable part, and the un-scanned portion from an intermediate air vehicle that scanned the terrain of the search and rescue site after the at least one leading air vehicle and before the at least one trailing air vehicle.

12. A system for a search and rescue (SAR) mission, the system comprising:
at least one leading air vehicle, wherein the at least one leading air vehicle includes:
at least one scanning device to scan a portion of a terrain of a search and rescue site to obtain searched area information, the searched area information including information captured by the scanning device of the portion of the terrain and images of the terrain;
at least one processor coupled to the at least one scanning device, the at least one processor being configured to process a search zone algorithm, the search zone algorithm
analyzes the scanned portion of the search and rescue site and the searched area information, and
determines a usable part of the scanned portion of the terrain that is suitable for at least one of landing or parking an air vehicle, images of the usable part as a safe landing zone, an unusable part of the scanned portion of the terrain that is not suitable for at least one of landing and parking the air vehicle, and an un-scanned portion of the terrain, based on an analysis result of the analyzing the scanned portion of the search and rescue site and the images of the terrain;

at least one memory coupled to the at least one processor, the memory storing leading air vehicle information and other information, the leading air vehicle information including information of the terrain, the analysis result of the analyzing of scanned portion of the search and rescue site processed by the at least one processor, and a GPS coordinate and the images of the usable part, the analysis result including a determination of the usable part, the unusable part, and the un-scanned portion, the other information including one or more of basic parameters of the at least one leading air vehicle, information related to crew members of the at least one leading air vehicle, activities involved in the search and rescue mission, time of day, and/or indication of type of subtask assigned to the at least one leading air vehicle;

at least one transmitter coupled to the at least one memory, wherein the transmitter is configured to transmit the leading air vehicle information and other information to a ground station or a central server, by uploading and syncing the leading air vehicle information on the central server; and at least one trailing air vehicle that reaches the search and rescue site after the at least one leading air vehicle.

13. The system of claim 12, wherein the ground station or the central server is configured to
receive the leading air vehicle information from the at least one leading air vehicle, and
communicate the leading air vehicle information to the at least one trailing air vehicle,
wherein the trailing air vehicle uses the usable part for at least one of landing and parking of the trailing air vehicle.

14. The system of claim 13, wherein the central server further includes a cloud computing system having a dynamic database such as navigational database or aerodrome mapping database.

15. The system of claim 12, wherein the at least one leading air vehicle further comprises a focus light to scan the unknown terrain.

16. The system of claim 12, wherein the at least one trailing air vehicle further includes:
a second scanning device to scan an additional portion of the terrain of the search and rescue site, the additional portion being a portion or all of one or both of the scanned portion of the terrain and the un-scanned portion of the terrain;
a second processor coupled to the second scanning device, the second processor configured to process the search zone algorithm that analyzes the additional portion of the terrain;
a second memory coupled to the second processor, the second memory storing trailing air vehicle information, the trailing air vehicle information including information and analysis of the additional portion of the terrain to update the leading air vehicle information; and
a second transmitter coupled to the second memory, wherein the transmitter is configured to transmit the trailing air vehicle information to the ground station or the central server.

17. A method to assist in a search and rescue mission, the method comprising:
receiving leading air vehicle information and other information about a search and rescue site from a leading air vehicle,
the leading air vehicle information including
searched area information, the searched area information being information of a portion of a terrain of the search and rescue site obtained from a scanning device included in the leading air vehicle and images of the terrain,
a determination of a usable part of a scanned portion of the terrain that is suitable for at least one of landing and parking an air vehicle, images of the usable part as a safe landing zone, an unusable part of the scanned portion of the terrain that is not suitable for at least one of landing and parking the air vehicle, and an un-scanned portion of the terrain, based on analysis of the searched area information and the images of the terrain, and
a GPS coordinate of the usable part,
the other information including one or more of:
basic parameters of the at least one leading air vehicle,
information related to crew members of the at least one leading air vehicle,
activities involved in the search and rescue mission,
time of day, and/or
indication of type of subtask assigned to the at least one leading air vehicle;
storing the leading air vehicle information and the other information to provide access to at least one trailing air vehicle; and
communicating the leading air vehicle information and the other information to the at least one trailing air vehicle including the determination the GPS coordinate and the images of the usable part, wherein the at least one trailing air vehicle is an air vehicle that trails the leading air vehicle.

18. A method of claim 17, the method further comprising:
receiving additional information about the terrain of the search and rescue site when the at least one trailing air vehicle reaches the search and rescue site and the at least one trailing air vehicle determines that the searched area information has changed;
updating the leading air vehicle information to include the additional information about the terrain, the additional information being based on scanning another portion of the terrain at the search and rescue site using another scanning device to obtain updated searched area information, the updated searched area information including information captured by the another scanning device of a portion or all of one or both of the scanned portion of the terrain and the un-scanned portion of the terrain; and
communicating the updated leading air vehicle information to at least one other trailing air vehicle, wherein the at least one other trailing air vehicle trails the at least one trailing air vehicle.

* * * * *